(12) United States Patent
Anamandra et al.

(10) Patent No.: US 12,019,600 B1
(45) Date of Patent: Jun. 25, 2024

(54) AUTOMATED OPTIMIZATION OF BRANCHED PROCESSES PROVIDING IMPROVED PROCESS EFFICIENCY

(71) Applicant: SAP SE, Walldorf (DE)

(72) Inventors: Sai Hareesh Anamandra, Bengaluru (IN); Rohit Jalagadugula, Visakhapatnam (IN); Gopi Kishan, Raxaul (IN); Akash Srivastava, Lucknow (IN); Kavitha Krishnan, Bangalore (IN); Jayanthi Subramanian, Bangalore (IN); Diwakar Maurya, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/125,089

(22) Filed: Mar. 22, 2023

(51) Int. Cl.
*G06F 16/24* (2019.01)
*G06F 16/22* (2019.01)
*G06F 16/2457* (2019.01)

(52) U.S. Cl.
CPC ........ *G06F 16/22* (2019.01); *G06F 16/24575* (2019.01)

(58) Field of Classification Search
CPC .......................... G06F 16/22; G06F 16/24575
See application file for complete search history.

(56) References Cited

U.S. PATENT DOCUMENTS

| | | | | |
|---|---|---|---|---|
| 5,442,778 A * | 8/1995 | Pedersen | ................. | G06F 16/93 |
| | | | | 707/999.005 |
| 6,646,573 B1 * | 11/2003 | Kushler | ................. | G06F 3/0233 |
| | | | | 341/28 |
| 11,080,349 B1 * | 8/2021 | Zhang | ..................... | G06F 16/22 |
| 11,195,067 B2 * | 12/2021 | Shrestha | ................. | G06N 3/08 |
| 2005/0038785 A1 * | 2/2005 | Agrawal | ................. | G06F 16/81 |
| 2017/0011091 A1 * | 1/2017 | Chehreghani | ....... | G06F 16/2455 |
| 2022/0349716 A1 * | 11/2022 | Rachedi | .............. | G01C 21/206 |
| 2022/0398331 A1 * | 12/2022 | Karlberg | ............. | G06F 21/6209 |
| 2023/0205821 A1 * | 6/2023 | Vadlamudi | ......... | G06F 12/0893 |
| 2023/0266766 A1 * | 8/2023 | Anand | ................. | G05D 1/0088 |
| | | | | 701/25 |
| 2023/0289618 A1 * | 9/2023 | Takahashi | ............. | G06N 3/045 |

* cited by examiner

*Primary Examiner* — Eliyah S. Harper
(74) *Attorney, Agent, or Firm* — Klarquist Sparkman, LLP

(57) ABSTRACT

Technologies and solutions are provided for improving process efficiency/identifying efficient paths of process steps. A target outcome can be identified, which can be a particular status, such as a stage (or status/step) in a process, or a target outcome can be an identification of particular process statuses that can be reached, such as given a particular set of constraints. Proceeding between process steps involves the use of resources, where a process step can be reached, or having an increased chance of being reached, when the resources have been obtained. Various paths can exist for obtaining a resource, where some paths can be more efficient than others. Based on resource paths and paths between steps of a process, one or more paths can be suggested for reaching the target outcome, including providing information about the process step paths or the resources paths for reaching the target outcome.

20 Claims, 10 Drawing Sheets

AUTOMATED OPTIMIZATION OF BRANCHED PROCESSES PROVIDING IMPROVED PROCESS EFFICIENCY

FIELD

The present disclosure generally relates to computer-implemented optimization of branched processes.

BACKGROUND

A process, including computer-implemented processes, are by their very definition sequences of actions or steps. Some processes can be relatively simple, such as a linear sequence of steps. While outcomes can be defined for individual process steps, often a process will have a step that represents an overall outcome of the process, such as a desired result. In addition to simple linear processes (where "simple" refers to the structure of the process, not the relative ease of completing the process or any particular operations in the process), processes can have different starting points or branching points, such that an outcome of the process can be reached by any one of multiple paths.

When multiple paths to an outcome exist for a process, the paths can be the same, such as in terms of a number of operations or an overall amount of resources (such as time) to reach the outcome, or they may differ in one or both of these characteristics. For example, one path may involve fewer operations than another path, but may have more complex operations for at least a portion of its steps, and so may require greater resources (such as taking a longer amount of time) than paths that include a larger number of shorter duration steps.

To reduce the amount of resources consumed in a process, it can be desirable to use the least-resource intensive task. However, it can be difficult to determine the path of lower resource use manually and accurately. In addition, a particular set of inputs to a process may influence whether certain steps in the process are available, as well as whether a particular step has already been completed (that is, the process can start from other than an "initial" entry point), or whether particular operations (or requirements) for one or more steps have already been completed or satisfied. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies and solutions are provided for improving process efficiency/identifying efficient paths of process steps. A target outcome can be identified, which can be a particular status, such as a stage (or status/step) in a process, or a target outcome can be an identification of particular process statuses that can be reached, such as given a particular set of constraints. Proceeding between process steps involves the use of resources, where a process step can be reached, or having an increased chance of being reached, when the resources have been obtained. Various paths can exist for obtaining a resource, where some paths can be more efficient than others. Based on resource paths and paths between steps of a process, one or more paths can be suggested for reaching the target outcome, including providing information about the process step paths or the resources paths for reaching the target outcome.

According to one aspect of the present disclosure, a technique for calculating paths for obtaining a process outcome is provided, including calculating path durations for the respective paths. Input data is received that includes a first set of values for a first set of attributes and a target objective value. The first set of attributes includes an execution time attribute. A second set of values defined for the target objective value is identified. A first plurality of data objects representing values of the first set of values are retrieved. A second plurality of data objects representing values of the second set of values are retrieved.

For respective pairs of data objects selected as an object of the first plurality of data objects and an object of the second plurality of data objects, at least one path is determined of data objects from a third plurality of data objects that connects a given pair of data objects of the respective pairs of data objects to provide a fourth plurality of data objects. A data structure is formed that includes the fourth plurality of data objects, wherein data objects of the fourth plurality of data objects form nodes of the data structure, wherein connection paths between respective pairs of data objects in the fourth plurality of data objects are determinable from the data structure.

For respective pairs of data objects in the fourth plurality of data object, one or more paths are determined between nodes of the plurality of nodes that connect data objects of a respective pair of data objects. For nodes in the one or more paths, a node occurrence frequency is calculated. For edges connecting a pair of nodes in the one or more paths, an edge occurrence frequency is calculated. For paths of the one or more paths, a path duration is calculated as a sum of duration attribute values for nodes in a given path of the one or more paths. One or more scores for respective paths of the one or more paths are calculated using one or more of the node occurrence frequency, the edge occurrence frequency, or the duration. Node information for nodes in the respective paths and at least one score of the one or more scores is displayed.

According to a further aspect of the present disclosure, another technique for calculating paths for obtaining a process outcome is provided, including calculating path durations for the respective paths. Input data is received that includes a first set of values for a first set of attributes and a target objective value. A second set of values defined for the target objective value is identified. A first plurality of data objects representing values of the first set of values are retrieved. A second plurality of data objects representing values of the second set of values are retrieved.

For respective pairs of data objects selected as an object of the first plurality of data objects and an object of the second plurality of data objects, at least one path is determined of data objects from a third plurality of data objects that connects a given pair of data objects of the respective pairs of data objects to provide a fourth plurality of data objects. A data structure is formed that includes the fourth plurality of data objects, wherein data objects of the fourth plurality of data objects form nodes of the data structure, wherein connection paths between respective pairs of data objects in the fourth plurality of data objects are determinable from the data structure.

For respective pairs of data objects in the fourth plurality of data object, one or more paths are determined between nodes of the plurality of nodes that connect data objects of a respective pair of data objects. For paths of the one or more paths, a path duration is calculated as a sum of duration attribute values for nodes in a given path of the one or more paths. Node information for nodes in the respective paths is displayed.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
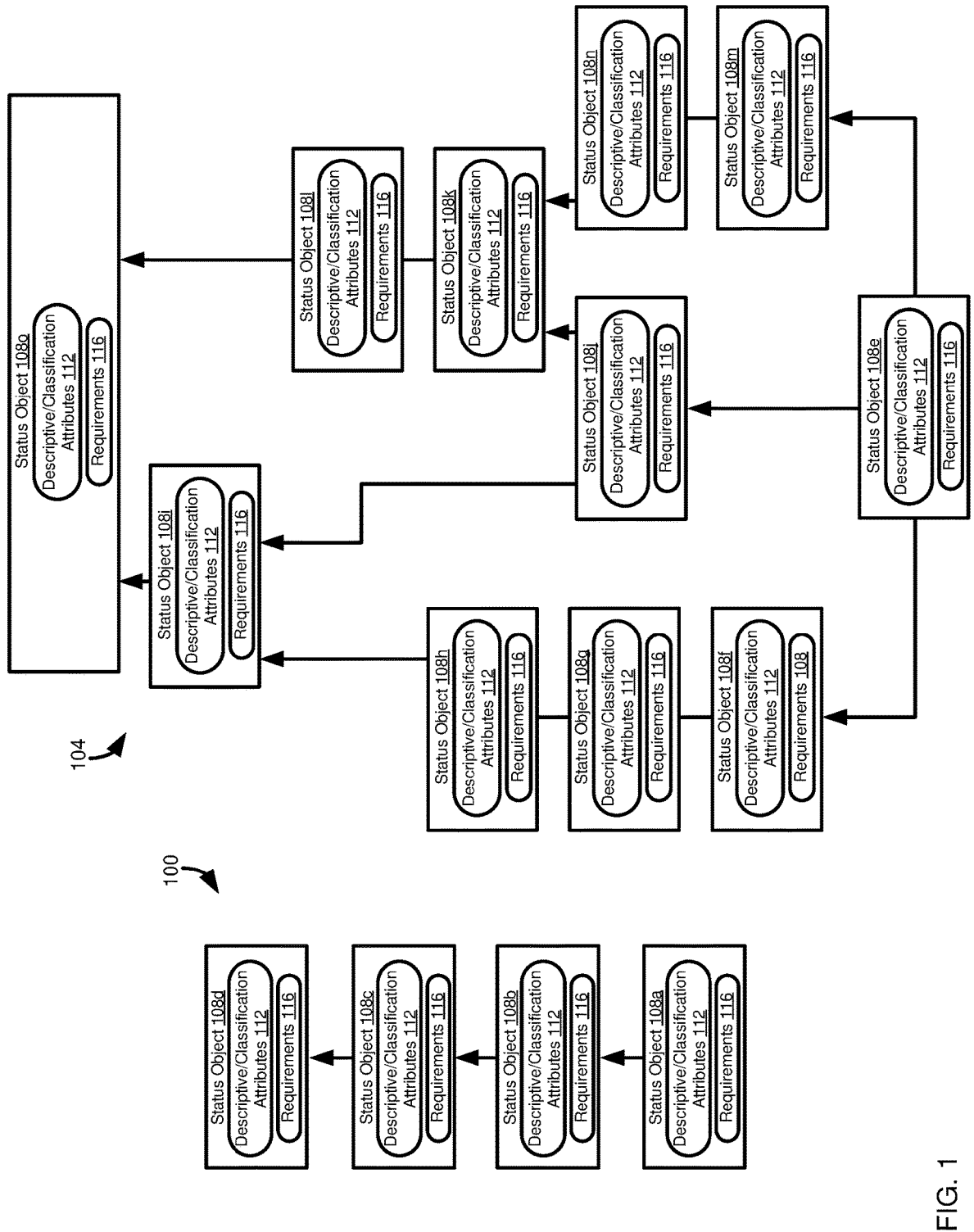
FIG. 1 is a diagram illustrating status objects, and components thereof, and relationships between status objects, including how status objects can be hierarchically arranged and different paths may be available from a starting status object to a target or ending status object.

A process, including computer-implemented processes, are by their very definition sequences of actions or steps. Some processes can be relatively simple, such as a linear sequence of steps. While outcomes can be defined for individual process steps, often a process will have a step that represents an overall outcome of the process, such as a desired result. In addition to simple linear processes (where "simple" refers to the structure of the process, not the relative ease of completing the process or any particular operations in the process), processes can have different starting points or branching points, such that an outcome of the process can be reached by any one of multiple paths.

When multiple paths to an outcome exist for a process, the paths can be the same, such as in terms of a number of operations or an overall amount of resources (such as time) to reach the outcome, or they may differ in one or both of these characteristics. For example, one path may involve fewer operations than another path, but may have more complex operations for at least a portion of its steps, and so may require greater resources (such as taking a longer amount of time) than paths that include a larger number of shorter duration steps.

To reduce the amount of resources consumed in a process, it can be desirable to use the least-resource intensive task. However, it can be difficult to determine the path of lower resource use manually and accurately. In addition, a particular set of inputs to a process may influence whether certain steps in the process are available, as well as whether a particular step has already been completed (that is, the process can start from other than an "initial" entry point), or whether particular operations (or requirements) for one or more steps have already been completed or satisfied. Accordingly, room for improvement exists.

Disclosed innovations are described with respect to "status objects" and "requirements." A status object refers to a particular outcome that is achieved when requirements of a set of requirements for the status object are satisfied. A status object can represent the completion of a particular process step in a path of status objects to achieve a process outcome. In some cases, the path of status objects can be linear. In other cases, multiple paths to a given process step/status, which can be an overall outcome of the process or a particular step of the process prior to the overall outcome, exist.

Status objects are associated with respective sets of one or more resources (also referred to as "requirements"). In at least some implementations, a particular step of a process, represented by a status object, can be reached when all of the requirements specified for that status object have been obtained. Just as paths between status objects can have multiple paths, a resource can be obtained in a linear manner from one or more prior resources, or can be reached through multiple possible paths.

Although disclosed techniques can be used in a variety of scenarios, one scenario in which disclosed techniques can be used is in updating a computing system, which can include updating one or both of hardware associated with the computing system, or one or more software programs executed on the computing system. Consider that various type of updates can exist for a software application. Particularly for complex software applications, periodically new versions of the software application may be released, but in the interim various enhancements or bug fixes can be released.

Code updates, such as in software available from SAP SE, of Walldorf, Germany, can be released in a type of update known as a "note." Notes can include "correction instructions" for updating software, including to implement bug fixes or improve compatibility. Notes can be hierarchical in nature, in that some notes can only be applied after earlier notes. In some cases, notes can be applied in different orders, or some notes may include instructions from other notes. Notes can be used alongside of other update mechanisms, such as patches. Again, different notes can be appropriate for a particular software application depending on what patches have been installed, as well as any other software update mechanisms.

Further, software updates can sometimes depend on particular hardware being present on a computing system, or the availability of other software applications. For example, a software program may use functionality of a web browser, and so the availability of the web browser, and potentially the version/update status of the web browser, can affect what updates can be applied to the software program. Particular updates or software programs can require particular computing resources, such as a particular amount of available computing resources, memory resources, or networking resources.

Assume that it is desired to have a software application reach a particular state, which can be an outcome state. There can be multiple states between a state the software application is presently at and the outcome state. There may be multiple paths through a portion of the multiple states to reach the outcome state, each having a set of resources required to reach the state. In turn, there can be paths between resources at a given state in the process and resources needed to reach a next state in the path to the outcome state. The present disclosure provides techniques to identity the status object and their associated resources, paths between the states, and paths between resources at a starting status object and a next status object on one of the possible status object paths, such as up until a particular outcome state is reached.

Once the status object paths and resource paths have been identified, one or more cost measurements can be obtained for individual steps in the respective paths, and an overall score for a respective path can be calculated as a sum of such scores. A particular path can be selected, such as based on a single overall score or a combination of scores. In some cases, paths may be subject to particular input constraints. For example, one path may be less costly according to at least one score, but it may have characteristics, such as a duration, that are unsuitable for the input constraints.

As will be described, the path analysis described above can be used in at least two ways. In a first way, an outcome is identified and at least a portion of paths usable to reach the outcome, and optionally associated scores, are provided. In a second way, a set of input constraints can be provided, and status objects that are achievable within those constraints can be identified, along with path cost information as described above, including for multiple paths.

For simplicity of discussion, certain Examples that follow use an example scenario of career guidance and planning. For example, an employee may wish to reach a particular position within a company. That position may require particular experience or skills. There may be a variety of positions that the employee could take to progressively reach the desired position. Those positions may be in turn be associated with particular skills, where those skills can be achieved in various ways.

Disclosed techniques can provide information about potential position progressions that the employee could take to reach their goal, and information about how to achieve the skills or experience required for the positions in the path. The paths can be scored, such as by duration, difficulty level, and using information about prior trajectories of those who the desired outcome positions, or positions leading thereto, such as which positions were most commonly held, or what paths were used to obtain the required skills or experience for a given position. From this information, the user can select a career path that best meets their needs.

In another example, the employee may not have a particular career objective in mind. Thus, they may wish to explore what positions they might achieve, including given their current position and skills, possibly within a set of one or more constraints, such as a particular time limit. Positions and possible career paths can be provided to the user, along with information that can help the user determine the time needed for a particular path, or a difficulty in following a particular path, as well as information about paths most commonly taken to achieve a particular position or obtain a particular skill.

Example 2—Example Status Objects and Relationships Therebetween

FIG. 1 illustrates an example processes 100, 104 that each have a plurality of status objects 108 (shown as status objects 108a-108o), where a given status object includes a set of descriptive or classification attributes 112 and a set of one or more requirements 116 (which can also be attributes, where attributes can also be referred to as parameters, properties, or fields).

In the context of the career planning example, the descriptive/classification attributes 112 can include information such as a current position held by the employee, a particular role to which they are assigned, an organization or team to which they are assigned, projects to which they are assigned (including tools/software program involved in the project), information about the employee's workload, information about the employee's schedule (including leave/vacation time), a number of years of experience of the employee, and information about prior positions held by the employee.

The descriptive/classification attributes 112 can also include skills possessed by the employee, such as a measure of a proficiency in a computing language, skills associated with the use of particular programs or software development tools or product development areas, and any "soft skills" associated with the employee. Note that at least some of the descriptive/classification attributes 112 can also be, or can be used to determine, requirements of the requirements 116. For example, a certain skill may require the completion of one or more courses, where the courses can form part of the requirements 116.

The process 100 represents a comparatively simple, linear process where an outcome status, associated with status object 108d, can be reached from a status object 108a by progressing from the status object 108a to the status object 108b, from the status object 108b to the status object 108c, and from the status object 108c to the status object 108d. As described, progression along the process (or path) 100 is accomplished by progressively achieving the requirements 116 for a next status object 108 on the path. For example, status object 108b can be reached from status object 108a by obtaining the requirements 116 for the status object 108b, to the extent they are not already possessed.

In some cases, some or all of the requirements 116 can be directly specified for a given status object 108. In other cases, some or all the requirements 116 can be empirically determined. Further, while some requirements 116 may be "hard" requirements, in that a status object cannot be reached without the attribute, requirements may be "soft" in that satisfying the soft requirement may improve a chance of reaching a particular status object 108, but it may be possible to achieve the status object without satisfying the requirement, including by satisfying one or more other requirements, or simply accepting a lower chance of success.

Consider the career path example. In some cases, a position may have a hard requirement, such as a particular college degree or a particular certification. A position may also have alternative requirements, such as working in an area or in a particular position for a particular period of time, or having acquired a specific skill, including through some demonstrable means, such as passing a test.

In yet further examples, requirements may not be specified directly. However, an analysis of individuals having held various positions can reveal characteristics those individuals held that may have assisted in their obtaining a particular position. For example, in the case of a senior programmer position, it could be that employees having a certification in a particular programming language or particular software program more commonly held that position than people who did not have such certification.

In the discussion that follows, requirements 116 are generally specified for a status object, but they can be explicitly specified from a description of the status object or can be "discovered" by analyzing a data set, such as looking at career paths and employee characteristics for a particular organization. That is, if employees who achieved a particular position had particular attributes in common, those attributes could be classified as "requirements," even though they may not be expressly set for in a description of the position.

The process 104 is similar to the process 100, in that it shows how a status object 108o can be reached from a status object 108e. However, as will be described in more detail, status object 108o can be reached through multiple different paths. Although, for the processes 100 and 104, the status object 108a and 108e are referred to as "initial" status objects, it should be appreciated that other status objects may serve as "initial" status objects, and status objects other than the status objects 108d, 108o can be "target," "goal," or "outcome" status objects. For example, for the process 104, the process could start at status object 108m, with the goal of reaching the status object 108l.

For the process 104, paths from an "initial" (in this case, a terminal or "leaf" status object 108e to an outcome status object 108o) include:

Path 1: {108e, 108f, 108g, 108h, 108i, 108o}
Path 2: {108e, 108j, 108i, 108o}
Path 3: (108e, 108j, 108k, 108l, 108o}
Path 4: {108e, 108m, 108n, 108k, 108l, 108o}

It can be seen that the possible paths are of different lengths, where paths 1 and 4 are the longest, having six status objects 108, path 2 is the shortest path, having four status objects, and path 3 is intermediate, having five status objects. Thus, in terms of path length, path 2 might be preferred. However, status objects, as described above, can be associated with requirements 116, which can result in different status objects requiring differing amounts of resources to be achieved. Typically, resource amounts are tracked at the level of individual requirements 116, but, for purposes of the present disclosure, it will be assumed that a resource requirement is determined overall for a status object. In addition to being used for the sake of explanation, this scenario can represent a situation where duration is the only resource 116 that is used for determining the cost of the different paths.

Assume that the status objects 108, other than the initial status object 108e, have the following time requirements:

108f: 5
108g: 5
108h: 3
108i: 6
108j: 14
108k: 6
108l: 4
108m: 2
108n: 5
108o: 4

Using these values, the cumulative duration for each path is:

Path 1: 5+5+3+6+4=23
Path 2: 14+6+4=24
Path 3: 14+6+4+4=28
Path 4: 2+5+6+4+4=21

Thus, it can be seen that path 4 allows status object 108o to be reached in the shortest duration, even though it does not have the shortest path.

Example 3—Example Requirements and Relationships Therebetween

Figure 2:
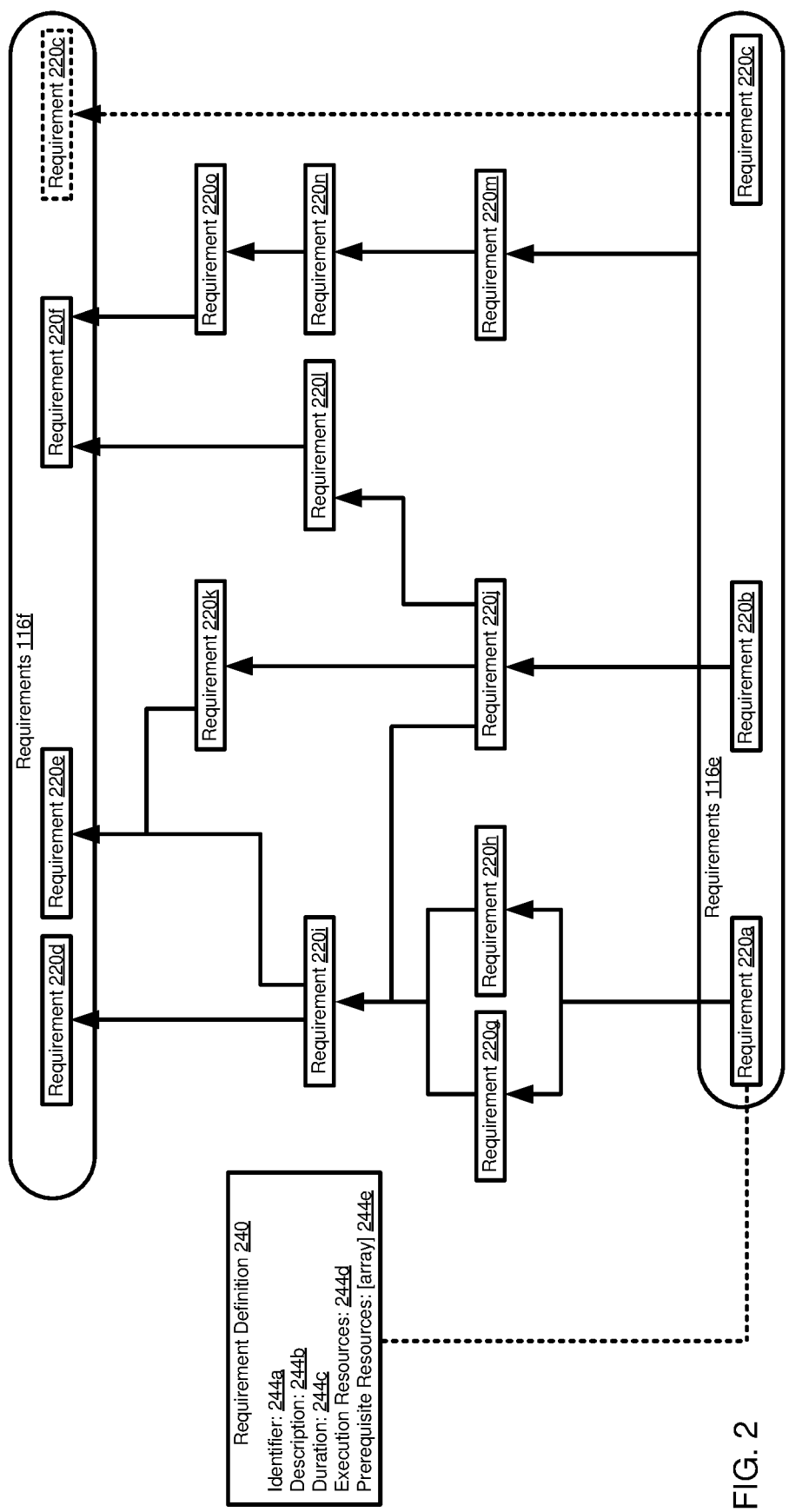
FIG. 2 is a diagram illustrating requirements (also referred to as resources), and components thereof, and relationships between requirements, including how requirements can be hierarchically arranged and different paths may be available from a starting requirement to a target or ending requirement.

FIG. 2 illustrates requirements 116e and 116f from status objects 108e and 108f, respectively, of FIG. 1. The requirements 116e, 116f represents sets or collections of individual requirements 220 (shown as 220a-220o), where the set of requirements 116e includes requirements 220a, 220b, and 220c, and the set of requirements 116f includes requirements 220d, 220e, and 220f.

It is noted that the various requirements in a set of requirements 116 can have different relationships between an initial status object (such as the status object 108e) and a subsequent status object (status object 108f). That is, some requirements in a subsequent status object can have a requirement in the initial status object as a prerequisite, where one or more intermediate requirements may be needed to convert the prerequisite to the requirement of the subsequent status object. This scenario is illustrated for the requirements 220a, 220b of the requirements 116e for the corresponding requirements 220d, 220e of the requirements 116f. Note that while single requirements 220 of the requirements 116e are shown for corresponding single requirements of the requirements 116f, in some cases multiple requirements of the requirements 116e are connected to a single or multiple requirements of the requirements 116f, or a single requirement of the requirements 116e is connected to multiple requirements of the requirements 116f.

In another type of relationship, a requirement 220 of the requirements 116f is required, but is not based on a requirement of the requirements 116e, such as shown for requirement 220f. In a further type of relationship, a subsequent status object 108 can require a prerequisite requirement 220, but the prerequisite requirement may or may not be explicitly included in the prerequisite requirement from an initial status object. For example, requirement 220c is not shown as being explicitly part of the requirements 116f (although in another implementation, it is explicitly included). Instead, requirements of the status object 108e can be incorporated by the status object 108f through a link to the prerequisite status object 108e. Thus, the requirements 116f can be thought of including any of the requirements 220 explicitly specified, as well as any requirements in any predecessor status objects.

A practical analogy may be helpful in understanding relationships between requirements 220, Consider college courses. Some colleges courses, such as math courses, may have a single prerequisite course, which in turn may have other prerequisite courses. A catalog listing a particular math course may only show the immediate prerequisite course, with the assumption that if the prerequisite course has been complete, by definition any prior prerequisite courses would also have been completed.

While a math course may have a single prerequisite, a science or engineering course may have multiple prerequisite courses, such as including both a prerequisite science or engineering course and a prerequisite math course. In some cases, as with the college coursework analogy, requirements 220 can have a "corequisite" relationship, meaning that the two requirements can be completed concurrently.

Turning to the specific requirements 220 of FIG. 2, it can be seen that requirement 220d can be satisfied in a single path starting from requirement 220a: 1:{220a, (220g, 220h), 220i, 200d}. However, requirement 220e can be satisfied in any of three paths, 2:{220a, (220g, 220h), 220i, 200e}, 3:{220b, 220j, 220i, 220e}, or 4:{220b, 220j, 220k, 200e}. Requirement 220f can be satisfied from either a path that starts from requirement 220b, or a path that is not directly associated with a requirement 220 of the requirements 116e, where the respective paths are 4:{220b, 220j, 220l, 200f} or 5:{220m, 220n, 220o, 220f}. In a similar manner as discussed above, requirement 220c is part of the requirements 220f, but can be either directly included as a requirement (in which case it is simply carried over from the requirements 116e), or can be an indirect requirement where the requirement 220c is assumed to be satisfied based on a link between the status object 108e and the status object 108f.

In a similar manner as described above for paths through status objects 108, paths through requirements 220 (which can be computing objects, and so requirements can also be referred to as requirements objects, or resource objects) can be associated with scores based on characteristics of a given requirement, and a path having the fewest number of elements (requirements) is not necessarily the most efficient path. For example, if requirement 220l is particularly difficult or time consuming, path 4 may not be the most efficient path for achieving requirement 220f, even though it is shorter than path 5.

While requirements can be defined as desired for a particular use case, FIG. 2 illustrates example properties of a requirement 220, in the form of a requirements definition 240 for the requirement 220a. The requirements definition 240 includes a plurality of properties 244 (shown as properties 244a-244e), which can be implemented as attributes/member variables of a data object (such as an instance of an abstract or composite datatype), including as attributes/fields of a relational database table).

A property 244a provides an identifier for a given requirement, which in at least some cases can be a unique identifier, either for a given set of resources 220 or across multiple sets of resources. A description property 244b can be used to provide a more semantically meaningful identifier for a resource 220, or can be used to provide a longer description of a given resource.

As discussed, a requirement 220 can be associated with a time (or multiple times, or a time range) for completing or obtaining the requirement, as well as other resources needed to complete the requirement. Corresponding, a property 244c provides a duration for completing a given requirement 220, while a property 244d can indicate other resources needed to complete the requirement, such as a level of effort, computer processing, computer memory, or computer networking resources. Although a single property 244d is shown in the definition 240, in other implementations the property 244d can be omitted, multiple properties can be included, or a value for the property 244d can provide values for multiple component properties (for example, an array that provides values for computer processor, computer memory, and computer networking resources).

As requirements 220 depend on/from one another, an attribute 244e can be used to store values for any prerequisite requirements (or in some cases corequisite requirements). In the case of requirement 220a, at least as shown, requirement 220a does not have any prerequisite requirements, and so the definition 240 can omit a value for the attribute 244e, or a value can be supplied that indicates that the requirement 220a has no prerequisite requirements. In the case where a requirement 220 has multiple prerequisite requirements, the value of the attribute 244e can be provided in an array or in another data structure or datatype that permits storage of multiple values.

Example 4—Example Computing Environment Providing Process Recommendations

Figure 3:
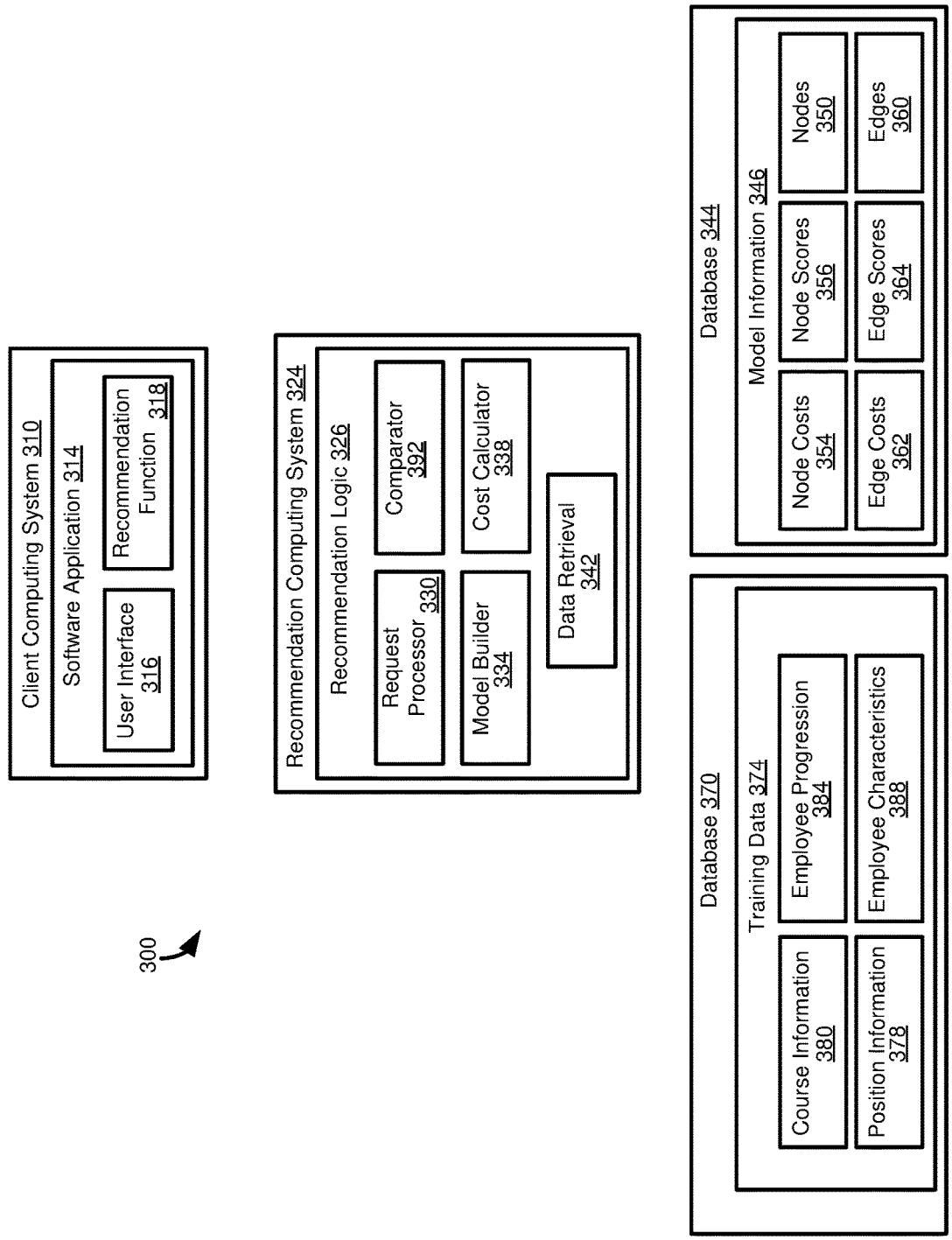
FIG. 3 is a block diagram of a computing environment in which disclosed technologies can be implemented, which depicts components of recommendation logic that can be used to generate models and process recommendation requests from, respectively, model information and training data.

FIG. 3 illustrates a computing environment 300 in which disclosed technologies can be implemented. To provide an easily understandable example of the present disclosure, as with the earlier discussion, the computing environment 300 is described with respect to data useable for career planning/recommendations. However, the computing environment 300 is generally useable with any type of data.

The computing environment 300 includes a software application 314 that is accessed by a user, and can be part of a client computing system 310. The software application 314 includes instructions useable to generate one or more user interfaces 316, where a user interface can be used to submit recommendation requests, where the requests can include, or identify, data to be used in a particular recommendation request. A user interface 316 can also provide recommendation results, and allow a user to interact with recommendation results. Interacting with recommendation results can include changing various parameters of a recommendation to see a possible impact or to get more information about particular aspects of a recommendation. For example, in the case of a career recommendation, a user may wish to get more information about particular courses that are recommended to obtain the qualifications needed for a particular position, or to obtain more information about a particular position.

The client computing system 310 also includes a recommendation function 318, which can be used to obtain a recommendation, or through which recommendation results are provided. That is, the recommendation function 318 can be called by the user interface 316, and receive data from, or provide data to, the user interface.

A recommendation request, such as from the recommendation function 318 of the client computing system 310, can be received by a recommendation computing system 324, in particular by recommendation logic 326 of the recommendation computing system. The recommendation logic 326 generally includes functionality (implemented in a computing language) to build models of a process using particular process components (such as status objects and requirements), as well to determine paths between various process components and associated costs.

The recommendation logic 326 includes a request processor 330. The request processor 330 is configured to receive requests from the recommendation function 318. The request processor 330 can, for example, determine what model should be used in processing a request, and receive and process data to provide request results that are returned to the recommendation function 318. In addition to processing recommendation requests, in at least some implementations, the request processor 330 can mediate requests for actions regarding models used in generating recommendation requests, such as to create, update, or delete such models.

A model builder 334 of the recommendation logic 326 can be used to create or update models. For example, the model builder 334 can be used to obtain information about elements used in a model, as well as connections between model elements. The model builder 334 can also calculate paths between model elements, and call functionality of a cost calculator 338 that calculate costs associated with paths between model elements. In a similar manner, the model builder 334 can be used to build up a model of elements relevant to a particular recommendation request, and then to call the cost calculator 338 to determine costs associated with different paths that are relevant to a recommendation request.

One or both of the request processor 330 or the model builder 334 can be in communication with a data retrieval component 342. The data retrieval component 342 can be used to interface with data sources, such as one or more databases, where model training data or model data can be stored. The computing environment 300 is shown as including a first database 344 that stores information 346 related to models used to represent processes and components thereof, and information about paths between such components, their use, and their costs.

In particular, the first database 344 is shown as including node information 350, which can be various processes components, where at least in some cases the node information is linked to a particular process (that is, a node can be associated with one or more process identifiers, and thus a set of nodes for a particular process can be retrieved using the process identifier). Node cost information 354 is also maintained in the first database 344, and can represent resources needed to progress between nodes (either status object nodes or resource object nodes). Node score information 356 can also be maintained in the first database system 344, where the score information can indicate, for example how frequently a node is present is a set of training data.

In a similar manner, the model information 346 can include identifiers for edges 360 of a model, including nodes associated with the edge and a directionality associated with an edge. Edge cost information 362 can represent a cost for traversing the edge, which in some cases can be used in place of the node cost information 354. Edge score information 364 can indicate how frequently an edge was traversed in training data.

For the nodes and edges, information about nodes or edges and their respective costs and scores are shown separately in the computing environment, in other cases multiple types of information can be combined, such as in a single table for nodes or edges. Similarly, although node and edge data are shown as being separately maintained, in other implementations node and edge information can be combined, such as in a single table, or in combined table for node/edge information, node/edge costs, and node/edge scores.

A second database 370 is shown as including training data 374, which can, for example, be a source of the model information 346 of the first database 344. Although two databases 344, 370 are shown and described, if desired, all or a portion of the information for such databases can be incorporated into a single database, whether in a single schema or in multiple different schemas.

As discussed at the beginning of this Example 4, components of the computing environment 300 can be used with data for any computer-implemented process, including an analog world process that is modelled or described in a computing language, such as using computing objects. That is, for example, the operations of the client computing system 310 and the recommendation logic 326, as well as the nature of model information 346, can be implemented without regard as to the underlying nature of the process data. However, for ease of understanding, the training data 374 is described specifically for the "career planning" scenario described above.

In the career planning scenario, a series of hierarchically arranged positions are present. A user may be interested in achieving qualifications for a terminal/leaf position (that is, an entry point/lowest position of a hierarchy), or for a higher-level position, whether the user already has a position within the hierarchy or does not yet have such a position. Positions in position information 378 can correspond to status object 108 described with respect to FIG. 1, and more generally can correspond to steps of a process.

Information about the positions can be stored in the position information 378, such as in one or more database tables. The position information 378 can include an identifier of the position, a description of the position, requirements of the position, relationships with other positions (such as predecessor position, if there is one specific position a user needs to have held in order to achieve a position, or successor position—positions to which a user can advance after holding a position), and optionally information about other characteristics of the position, which can include information such as the pay/benefits associated with the position, responsibilities associated with the position, or an expected workload for the position.

Although in this example scenario, requirements are described in terms of "courses" that are needed before a user is qualified for a particular position, other types of requirements can also be considered, which can be in addition to or in lieu of course requirements. For example, a requirement for a position may be expressed as minimum duration in a prior position or particular course requirements. Or, there may be both a course requirement and a minimum duration in a prior position.

Information about courses, which can be considered a specific type of the requirements 220 of FIG. 2, can be stored in course information 380. The course information 380 can include, for respective courses, a course identifier, a course description, prerequisite (or corequisite) courses for a given course, courses for which a given course serves as a prerequisite (or corequisite), information about a duration of the course, and optionally other information about a course, such as a measure of the course difficulty or workload.

The position information 378 and course information 380 can allow processes, in this case a career path, or set of possible career paths to be modelled, such as described in conjunction with FIG. 1 and FIG. 2. By itself, this information can provide useful information to users, as it can allow them to determine what positions may be available, and a corresponding effort and process to achieve a given position of the positions, or an effort and process to achieve a specified position. However, it can be useful to provide guidance based on which paths (for status objects/career positions or requirements/courses) have been observed in the past.

Accordingly, the training data 374 can include employee progression information 384. The employee progression information 384 can include one or both of career paths followed by particular employees (such as their current positions and prior positions held), as well as information about particular courses/course sequences taken by a given employee. As described, this information can be useful in providing career path recommendations, as it can highlight common sequences for obtaining a particular position, which a user may conclude may maximize their chances of success, or minimize the time needed to obtain a desired position.

Additional information can be used in identifying prospective career paths, such as employee characteristics 388. Employee characteristics 388 can include characteristics such as educational background, performance reviews, project responsibilities, or workload. As an example of how the employee characteristics 388 can be used, possible paths can be scored based on how similar employee characteristics for an employee for which a recommendation is being prepared are to employee characteristics in the training data 374. As another example, in some cases paths can be eliminated or scored higher or lower, based on how difficult, or time consuming, courses are in a possible career path. That is, even if one path is potentially of shorter duration than another path, it may be less recommended for a user who does not have sufficient available time to devote to courses in the career path.

Comparisons of paths, including in some cases with respect to specified constraints, can be performed by a comparator 392 of the recommendation logic 326. In comparing paths, the comparator 392 can use scores calculated by the cost calculator 338.

Example 5—Example Data Structures Usable in Obtaining Process Recommendations

Figure 4:
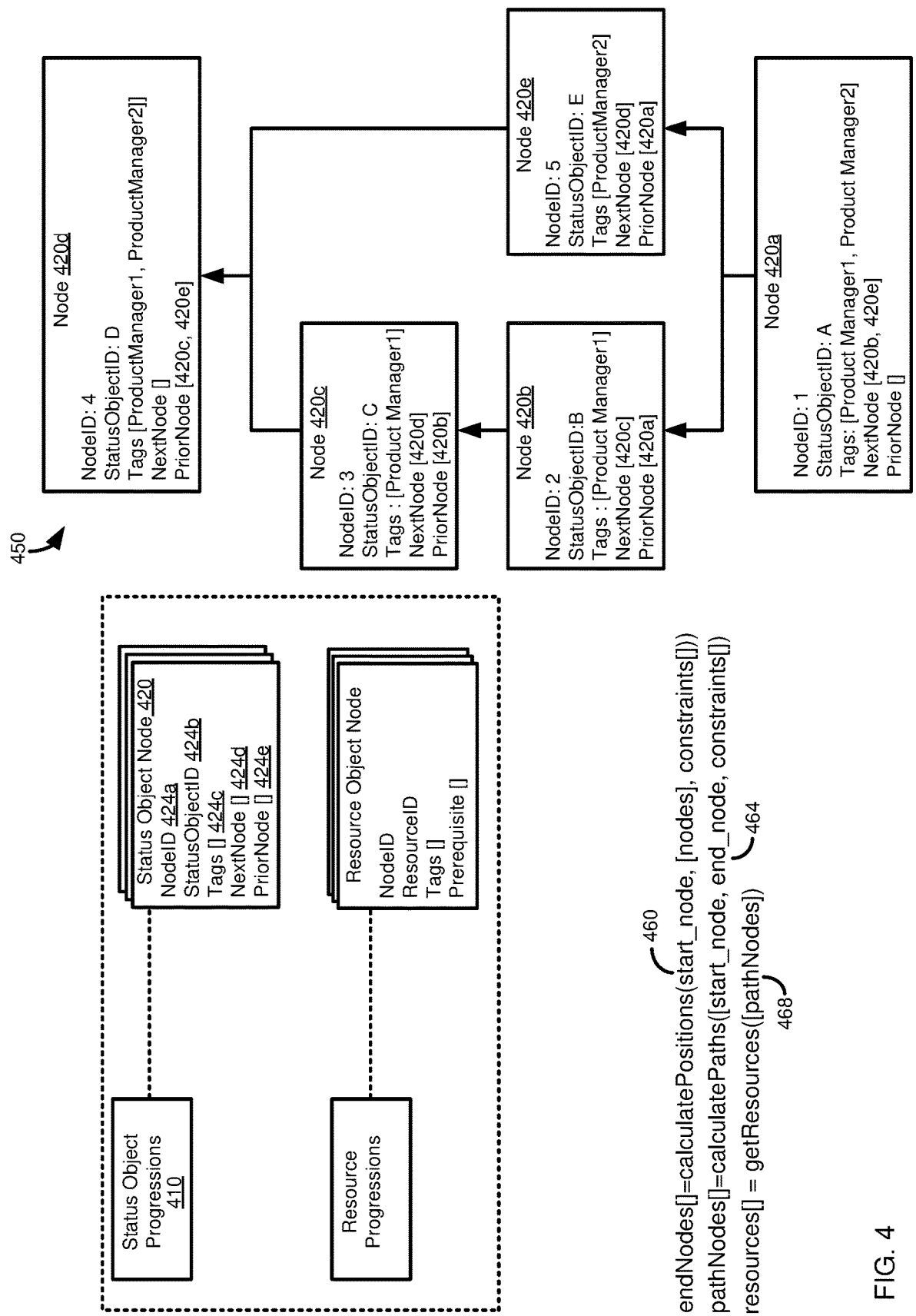
FIG. 4 illustrates how status objects can be represented as nodes, and relationships between status objects can be represented by edges, and example code for calculating potential end or target nodes for a path and calculating paths to such end or target nodes from a given starting node, as well as code for calculating resources involved in a particular path of status objects.
Figure 5:
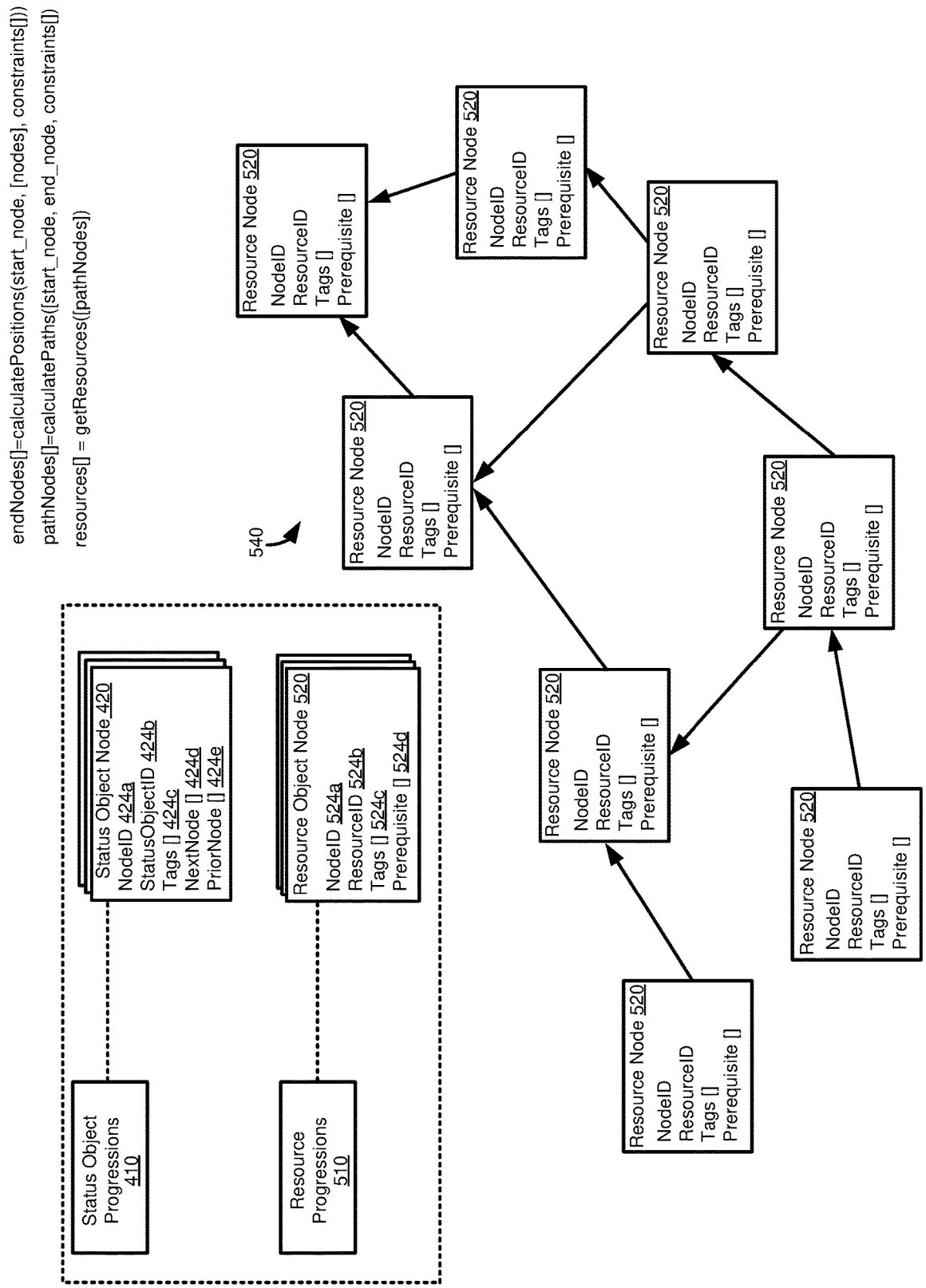
FIG. 5 illustrates how resources can be represented as nodes, and relationships between resources can be represented by edges, and example code for calculating potential end or target nodes for a path and calculating paths to such end or target nodes from a given starting node, as well as code for calculating resources involved in a particular path of resource objects.

FIGS. 4 and 5 illustrate how relationships between status objects or relationships can be expressed, and used to determine various process pathways for achieving an outcome (or identifying outcomes that can be achieved) and associated parameters, such as a duration or other "cost" involved with a particular path.

FIG. 4 illustrates how status object progressions 410 (a series of path/process steps from one status object to another status object) can be represented as a set of status objects. In FIGS. 4 and 5, status objects and resource objects are represented as nodes, where a representation of relationships between status objects or resource objects, or particular subsets thereof (such as those in a particular path for a larger set) can be a graph data structure. However, other data structures or data types can be used to store information about status objects or resources and their relationships, which can be used to determine path information. For instance, it may be useful to consider a set of status objects or resource objects as being a graph, but the data for the status objects or resource objects can be stored in one or more relational database tables.

FIG. 4 provides an example implementation of a status object node 420, and a graph 450 that can be constructed from a set of such nodes. FIG. 4 also illustrates how resource progressions can be associated with a resource object node. Details of resource progressions and resource object nodes, as well as a graph that can be constructed therefrom, are explained in the discussion of FIG. 5.

A status object node 420 can include a variety of properties 424 (shown as properties 424a-424e), which can be implemented as attributes or data members of a computing object, including as attributes/fields of a relational database table. A status object node 420 can include a node identifier 424a, and can include a status object identifier 424b. The status object identifier 424b can be used to retrieve information about a particular status object, such as the descriptive/classification attribute 112 or the requirements (or resources) 116 of FIG. 1, or the position information 378 in the specific career recommendation scenario discussed with respect to FIG. 3 (in which case the position information can identify particular courses required for the position, information about which can then be retrieved from the course information 380).

A status node 420 can include one or more tags, provided by values for a tag attribute 424c. A tag attribute 424c can be used, for example, to identify particular paths (such as career paths) that the status object (represented by the status object node) contributes to, or other information, such as a particular job type associated with the status object node. In some cases, information that can be included as tags 424c can be included as information (such as descriptive information 112) for a status object.

In at least some cases, a status object node 420 stores information about nodes to which it is related, such as a prior status object node (thus serving as a prerequisite), indicating using attribute 424d, or a next/subsequent node, indicated by attribute 424e, can identify status object nodes 420 for which the node serves as a prerequisite. Alternatively, a status object node 420 does not store information about relationships between status nodes. Rather, that information can be stored as edge information (such as the edge information 360 of FIG. 3), and the edge information can be used to relate status object nodes and to create a graph or similar representation of nodes/node relationships, including for the purpose of generating the graph 450.

The graph 450 illustrates comparatively simple relationships between a plurality of status object nodes 420a-420e. The nodes 420a-420e can be considered as a subset of a larger set of nodes, such as a subset that is relevant to a process of achieving a process status represented by the node 420d. In the context of the career planning scenario, a larger set of nodes 420 can be a set of all related positions within a company, while the set of nodes represented in the graph 450 can represent nodes relevant to achieving the position of product manager, represented by node 420d (from a "lower level" position).

The nodes 420a-420e have example values for the properties 424a-424e. While the values are believed to be self-explanatory, it is noted that values for the property 424c represent which of two possible paths to the product manager position represented by node 420d involve a given node. While the starting and ending nodes 420a, 420d are members of both paths, the remaining nodes 420b, 420c, 420e are members of a single path.

FIG. 4 also illustrates example pseudocode for obtaining paths between nodes, as well as for obtaining information about resources needed to complete a given path. Code 460 represents pseudocode for obtaining information about nodes that can be reached from a given node. In the career planning example, this can represent an employee wishing to know to which positions they might advance, as well as understanding the associated requirements, time, and other resources needed to achieve a given position. An array of end nodes is produced by calling a CalculatePositions (job positions) that can be reached given a particular starting node, an identifier of a set of nodes to be analyzed (or individual node identifier for nodes in the set), and optionally any constraints (such as duration to reach a given end node from a given starting node).

Pseudocode 464 represents a function to obtain nodes in paths between starting and ending nodes provided as function arguments and optionally any constraints, such as a time to complete a path. In at least some cases, the calculate path function 464 returns an array (or other data structure or datatype instance) that stores paths and identifiers of constituent nodes in the path.

Pseudocode 468 represents a function to obtain resources needed to traverse a path of nodes, where the input can be a set of nodes in the path. In a particular example, code 468 can represent node information for status objects corresponding to the nodes, such as the requirements information 116 of FIG. 1, which can be stored as position information of FIG. 3. The requirements obtained using the pseudocode 468 can be used to construct a set of nodes representing requirements (resources), which can then be represented as a graph or other representation of the requirements nodes and their relationships, which can then be analyzed to determine available paths between the nodes and path information, such as path scores or path costs.

FIG. 5 provides information about the status object progressions 410 and status object nodes 420, but also illustrates resource progressions 510 and resource object nodes 520, as well as a graph 540 that can be produced from resource nodes, where the "resource nodes" and "resource progressions" can also be considered as "requirements nodes" or "requirement progressions."

The resource progressions 510 can represent a set of related resource objects, such as a set of nodes where some resource object nodes can only be reached or acquired through other resource object nodes, such as described for the requirements 220 of FIG. 2. In a particular example, a set of resource object nodes needed for a particular career path is determined by first identifying positions in a career path, such as using the pseudocode 464, and then identifying resources required from the path using the pseudocode 468. Once the requirements are identified, they can be represented as resource object nodes 520, and one or more graphs (or other suitable representation) can be constructed for sets of related resource object nodes, and then path analysis can be performed to identify and score available paths to obtain a particular resource.

The resource object nodes 520 can include a variety of properties as desired for a particular implementation, where the properties can be attributes/data members of a data object, including being implemented as attribute/fields of a relational database table. Resource object nodes 520 are shown as including attributes 524a-524d. An attribute 524a can provide an identifier for a particular node, which can be unique for a particular set of resource nodes 520 or unique across multiple sets of resource nodes. A resource identifier attribute 524b can be used to link a resource object node 520 with a particular resource, such as information in the requirement definition 240 of FIG. 2 or, in the career planning example, in the course information 380 of FIG. 3.

A resource object node 520 can include one or more tags 520c, where a tag can be used to associate a resource node with a particular set of status objects (or corresponding status object nodes 420), a particular path of status objects, or other categorization or descriptive attributes. For example, in the case of the career planning scenario, the tags 520c can include information such as a skill acquired (or partially acquired) through the course, and positions for which the course is required. Among other things, the tags 520c can be used to identify resource object nodes 520 that are relevant to particular purposes, and their associated resources, such as resources needed to achieve a particular position or a particular skill.

As with the status object nodes 420, relationship information can be included in resource object nodes 520 in a variety of ways, or can be stored elsewhere, such as in edge information. The resource nodes 520 are shown as including a prerequisite attribute 520d. In some cases, values for the attribute 520d can represent all prerequisites for a given node 520, including prerequisites that are satisfied indirectly by a prerequisite that is directly specified for a resource. In other cases, the prerequisite attribute 520d only stores values for prerequisites that are expressly defined for a given resource.

The graph 540 illustrates how resource object nodes 520 can serve as prerequisites for other nodes. While the arrows in the graph 540 show a progression to particular resource object nodes 520, the arrows could also be reversed to illustrate prerequisite relationships between resource object nodes, where downstream resource nodes point to upstream resource object nodes that serve as its requirements. Although specific values are not shown for the resource object node 520 of the graph 540, the values can be provided in an analogous manner as shown for the graph 450 of FIG. 4, where values for the tags 424c can instead be values as described for the tags 524c.

As noted earlier, resources can be required for a particular status object, or may be "soft" requirements, where instances of the status object might more commonly be associated with a particular resource, which can indicate that having a particular resource can improve the chance of reaching a particular status object. Path analysis/recommendations can take a more nuanced approach than simply determining the presence or absence of a resource. That is, for example, in some cases one or more resources associated with a status object can be such that the lack of the resources does not prohibit reaching the status object, and having the resource may not guarantee reaching the status object. Information about the relative importance of a resource can be provided as part of a path recommendation. For instance, resources associated with the path can be provided with a value indicating a relative importance of a given resource, which can be based, for example, on how commonly the resource was present in a set of training data. The presence of a resource can influence the probability of reaching the status object.

Example 6—Example Scoring of Process Recommendations

Once the graphs 450, 540 of FIGS. 4 and 5 have been generated, paths, analogous to those described above with respect to FIGS. 1 and 2, can be identified, such as using well known pathfinding/search algorithms such as breadth-first search, depth-first search, or shortest path algorithms. In some cases, providing paths and associated costs, such as a duration, can be useful information in and of itself, such as in the career planning example. However, it can be useful to provide additional information about various paths, such as based on historical (or artificially generated) data. An alternative, a graph of nodes, along with starting and ending nodes and any constraints can be provided to a graph convolutional network, which can be combined with an optimized tree search algorithm, such as a branch and bound algorithm to provide paths. The graph convolutional network can be trained using historical data, such as the employee progression information 384 of FIG. 3.

Figure 6:
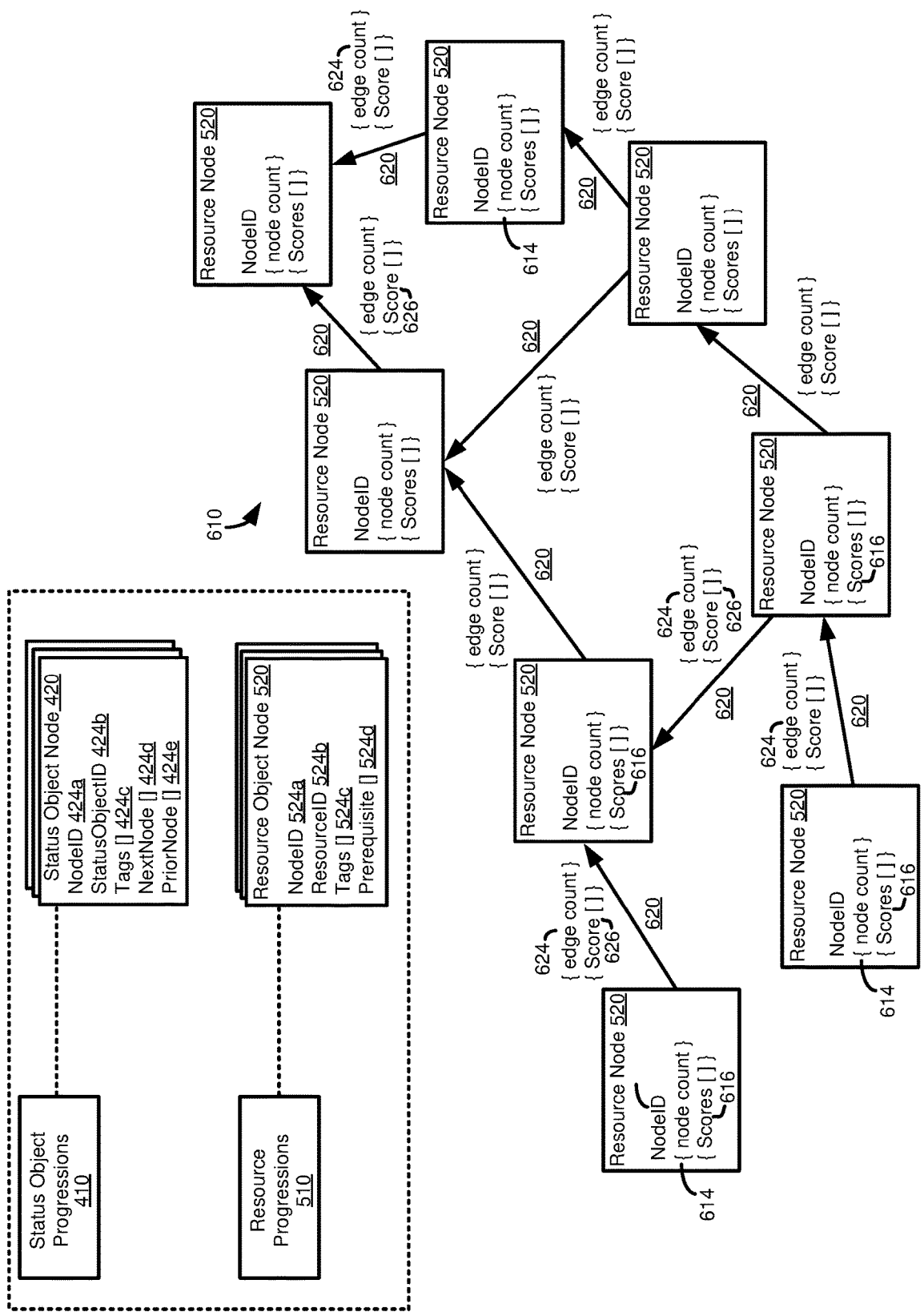
FIG. 6 illustrates how edge and node scores can be calculated, which can be used to score paths that includes such nodes/edges.

FIG. 6 illustrates a graph 610 that corresponds to the graph 540 of FIG. 5. However, it can be seen that the information about the resource object nodes 520 (or "resource node," for brevity) has been updated to include a node count 614 and node score 616, where these properties can be part of the attributes 524 of a resource object node, or can be otherwise maintained in association with an identifier for a respective resource object node.

The graph 610 is also shown as including information for edges 620, such as an edge count 624 and edge scores 626. Although not shown in FIG. 6, other information can be maintained for edges 620, such as an edge identifier, indicators of nodes connected by an edge, or a directionality of the edge. This information, as well as the edge count 624 and edge scores 626, can be maintained as the edge information 360 and edge score information 364 of FIG. 3.

The node count 614 and the edge count 624 can be calculated as a number of times a particular node was part of, or an edge traversed in, a set of training data, where the set of training data can be a particular graph of status object nodes or resource object nodes, or for particular paths for such a graph.

A node weight can be calculated from the node count of a given node (which can be a resource object node or a status object mode) in various manners. In one implementation, the node weight is calculated as the number of times the node was present in a set of training data (such as a set of historical career paths) divided by the total number of nodes represented in the training data. In another implementation, the node weight is calculated as:

$$\frac{1}{\sqrt{\text{node frequency in training data set}}}.$$

Lower node weights correspond to more commonly represented nodes. Edge weights can be calculated in a similar manner as node weights.

Node and edge weights can be used to calculate path scores. For a given path, a cumulative score can be calculated as:

$$\sum\left(\frac{1}{\text{Node/Edge Weight}}\right) - 1 - 0.5.$$

An overall score can be calculated as the average of the cumulative node weight score and the cumulative edge weight score.

Example 7—Example Career Recommendation Process

This Example 7 provides example implementation details for a specific use case of disclosed techniques with respect to the career planning scenario. In this case, resources/requirements, and relationships therebetween, are obtained from a particular data source, such as SAP Learning HUB, a service available from SAP SE, of Walldorf, Germany. Courses can be selected from the data source, and a corresponding node created. A given node, or another object referenced by the node (such as a status object) can include information about the course, such as an identifier, a description, a duration, or a difficulty level/time commitment or effort requirement.

Information about prerequisite courses is also stored for the node. Nodes are then created for the prerequisite courses. When all courses in a prerequisite chain from the course selected from the data source have been processed into nodes, a subgraph is defined. A disjoint set union is performed on the subgraph, and the subgraph and the disjoint set union graph (or graphs) are saved. Another course is selected from the data source and the process is repeated until all courses in the data set are processed.

User data is then analyzed to determine career paths taken by individuals, along with courses taken by the individuals. Unique career paths can be termed roadmaps. The roadmaps are analyzed and used to update node tags and node weights of nodes in the disjoint union subgraphs.

Assume now that an individual wishes to analyze a particular target position. Information for the individual can be obtained and analyzed to determine skills/resources possessed by the user, including by determining particular resources possessed by the individual as a result of their current position or a prior position. Resources required for the target position are determined, and subgraphs are determined from the graph information obtained by analyzing courses of the data source.

For example, as described earlier, nodes in a path for achieving a particular resource/skill can be saved in association with an identifier for the resource/skill, and then retrieved as part of the career path analysis. A graph can be created out of the subgraphs defined for the resource/skill. Paths to the resources/skills required for the target position can be traversed to determine a total time to achieve a resource/skill in a particular path, as well as the cumulative node weight score, edge weight score, and combined score described in Example 4.

Note that the determination of paths can take into account skills/resources possessed by the individual. That is, the paths stored as part of analyzing the courses in the data source can represent complete paths from an earliest prerequisite course to a "final" course, but an individual user may be at different points along the path, and thus the path analysis/scoring can stop if/when it is determined that the individual already possesses a particular resource/skill on a path. Once all paths have been identified, or at least paths satisfying optional constraints, the paths can be displayed to a user along with their corresponding scores.

Example 8—Example Operations

Figure 7A:
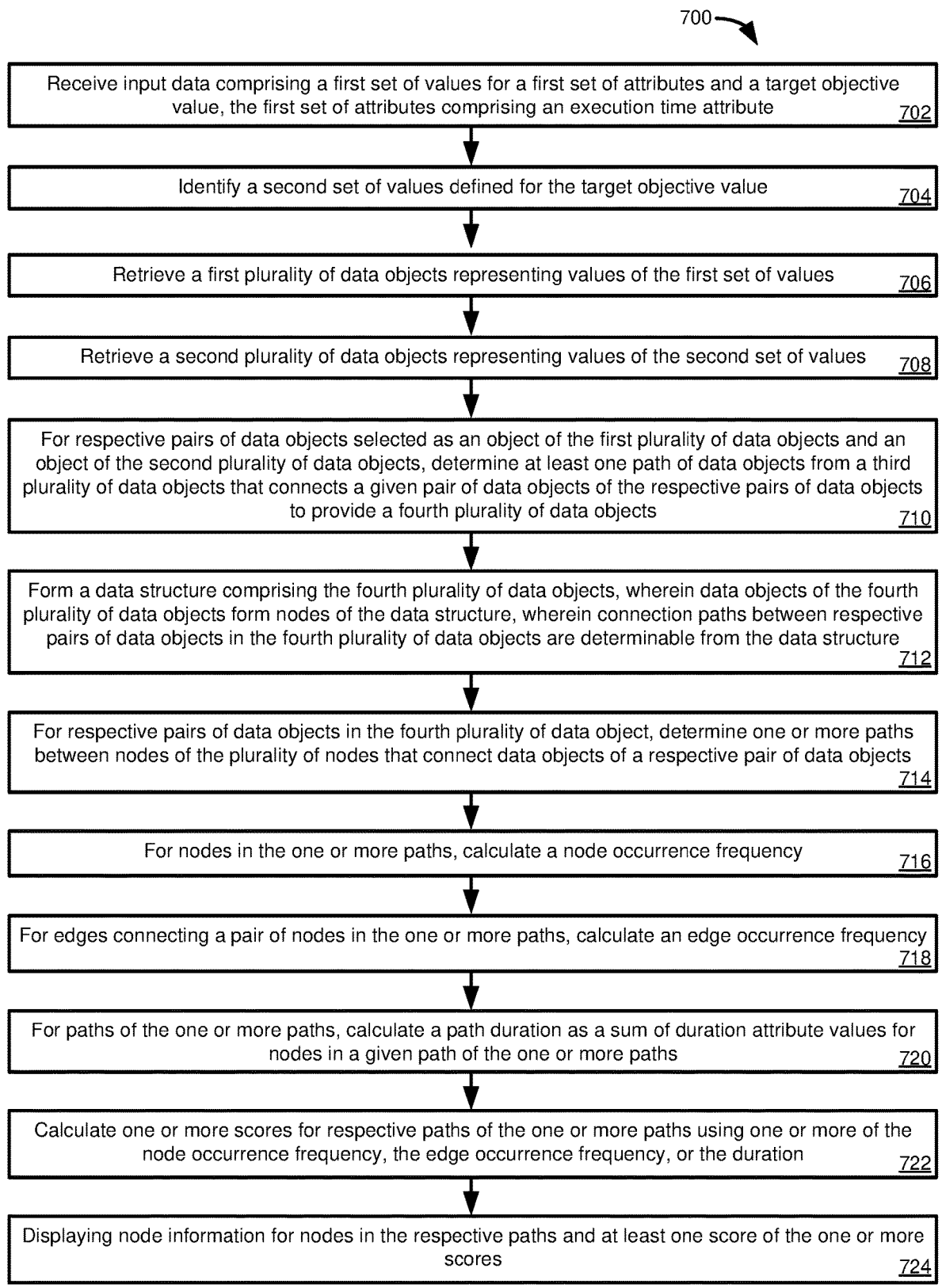
FIGS. 7A and 7B present flowcharts of processes for calculating paths for obtaining a process outcome, including calculating path durations for the respective paths.

FIG. 7A provides a flowchart of a disclosed process 700 of calculating one or more paths for obtaining a process outcome, including calculating one or more scores for given paths of the one or more paths.

At 702, input data is received that includes a first set of values for a first set of attributes and a target objective value. The first set of attributes includes an execution time attribute. A second set of values defined for the target objective value is identified at 704. At 706, a first plurality of data objects representing values of the first set of values are retrieved. A second plurality of data objects representing values of the second set of values are retrieved at 708.

For respective pairs of data objects selected as an object of the first plurality of data objects and an object of the second plurality of data objects, at 710, at least one path is determined of data objects from a third plurality of data objects that connects a given pair of data objects of the respective pairs of data objects to provide a fourth plurality of data objects. At 712, a data structure is formed that includes the fourth plurality of data objects, wherein data objects of the fourth plurality of data objects form nodes of the data structure, wherein connection paths between respective pairs of data objects in the fourth plurality of data objects are determinable from the data structure.

For respective pairs of data objects in the fourth plurality of data objects, one or more paths are determined at 714 between nodes of the plurality of nodes that connect data objects of a respective pair of data objects. At 716 for nodes in the one or more paths, a node occurrence frequency is calculated. At 718, for edges connecting a pair of nodes in the one or more paths, an edge occurrence frequency is calculated. For paths of the one or more paths, a path duration is calculated at 720 as a sum of duration attribute values for nodes in a given path of the one or more paths. At 722, one or more scores for respective paths of the one or more paths are calculated using one or more of the node occurrence frequency, the edge occurrence frequency, or the duration. Node information for nodes in the respective paths and at least one score of the one or more scores is displayed at 724.

Figure 7B:
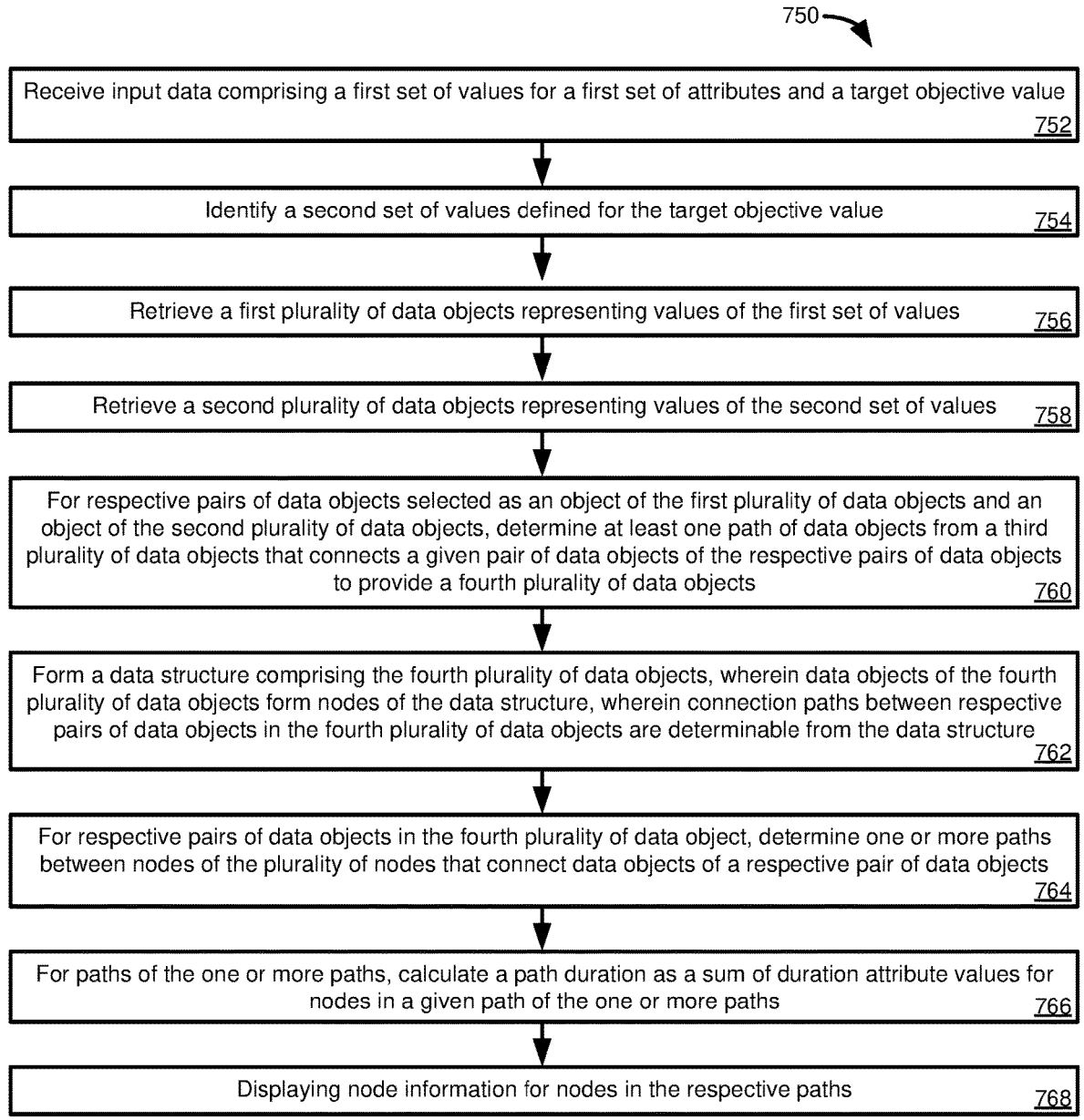

FIG. 7B provides a flowchart of a disclosed process 750 of calculating one or more paths for obtaining a process outcome. At 752, input data is received that includes a first set of values for a first set of attributes and a target objective value. A second set of values defined for the target objective value is identified at 754. At 756, a first plurality of data objects representing values of the first set of values are retrieved. A second plurality of data objects representing values of the second set of values are retrieved at 758.

For respective pairs of data objects selected as an object of the first plurality of data objects and an object of the second plurality of data objects, at 760, at least one path is determined of data objects from a third plurality of data objects that connects a given pair of data objects of the respective pairs of data objects to provide a fourth plurality of data objects. At 762, a data structure is formed that includes the fourth plurality of data objects, wherein data objects of the fourth plurality of data objects form nodes of the data structure, wherein connection paths between respective pairs of data objects in the fourth plurality of data objects are determinable from the data structure.

For respective pairs of data objects in the fourth plurality of data objects, one or more paths are determined at 764 between nodes of the plurality of nodes that connect data objects of a respective pair of data objects. For paths of the one or more paths, a path duration is calculated at 766 as a sum of duration attribute values for nodes in a given path of the one or more paths. Node information for nodes in the respective paths is displayed at 768.

Example 9—Computing Systems

Figure 8:
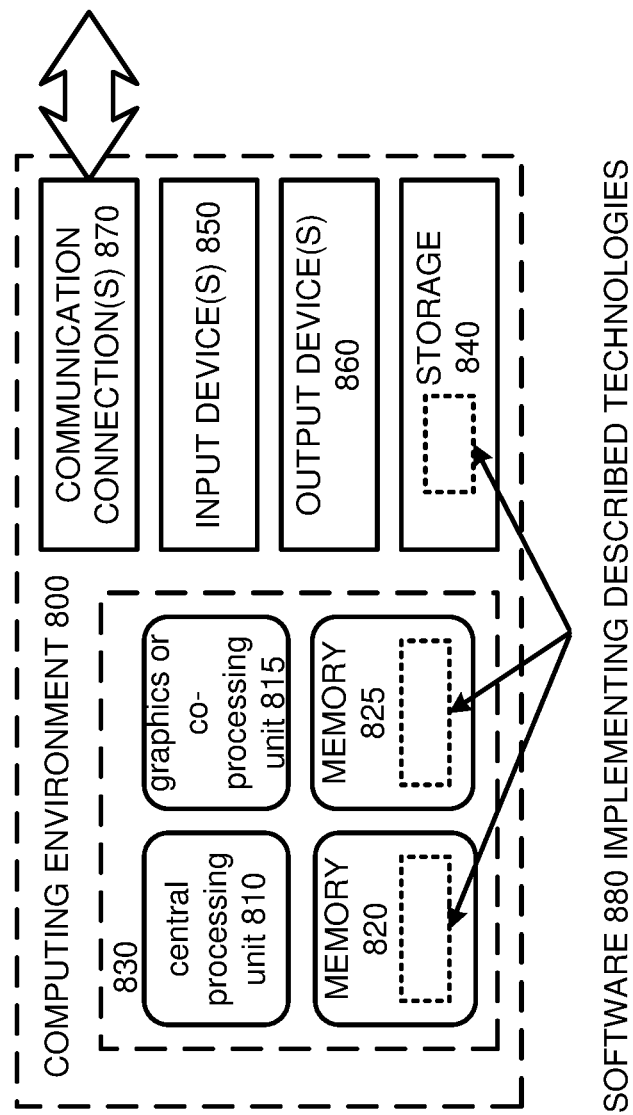
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), nonvolatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815. The memory 820, 825, may also store settings or settings characteristics, databases, data sets, interfaces, displays, object instances, or model.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 9:
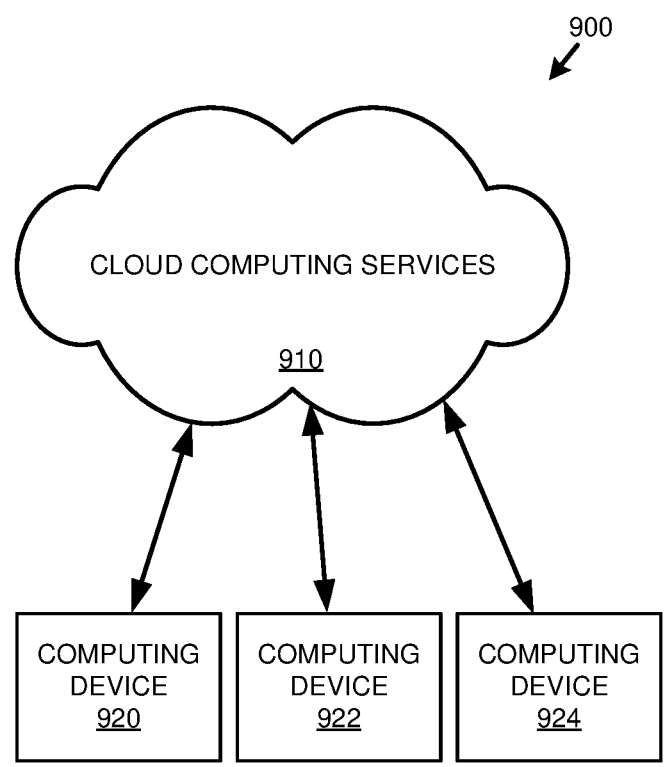
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware).

Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor;
   one or more computer-readable storage media storing computer-executable instructions that, when executed, cause the computing system to perform operations comprising:
   receiving input data comprising a first set of values for a first set of attributes and a target objective value, the first set of attributes comprising an execution time attribute;
   identifying a second set of values defined for the target objective value;
   retrieving a first plurality of data objects representing values of the first set of values;
   retrieving a second plurality of data objects representing values of the second set of values;
   for respective pairs of data objects selected as an object of the first plurality of data objects and an object of the second plurality of data objects, determining at least one path of data objects from a third plurality of data objects that connects a given pair of data objects of the respective pairs of data objects to provide a fourth plurality of data objects;
   forming a data structure comprising the fourth plurality of data objects, wherein data objects of the fourth plurality of data objects form nodes of the data structure, wherein connection paths between respective pairs of data objects in the fourth plurality of data objects are determinable from the data structure;
   for respective pairs of data objects in the fourth plurality of data object, determining one or more paths between nodes of the plurality of nodes that connect data objects of a respective pair of data objects;
   for nodes in the one or more paths, calculating a node occurrence frequency;
   for edges connecting a pair of nodes in the one or more paths, calculating an edge occurrence frequency;
   for paths of the one or more paths, calculating a path duration as a sum of duration attribute values for nodes in a given path of the one or more paths;
   calculating one or more scores for respective paths of the one or more paths using one or more of the node occurrence frequency, the edge occurrence frequency, or the duration; and
   displaying node information for nodes in the respective paths and at least one score of the one or more scores.

2. The computing system of claim 1, wherein the first set of attributes comprises an identifier of a status data object of a plurality of status data objects, the input data comprises a value identifying a first status data object of the plurality of status data objects, and the target objective value comprises a value identifying a second status data object of the plurality of status data objects.

3. The computing system of claim 2, wherein the plurality of status data objects represent operations useable to carry out a process, wherein a status data object of the plurality of status data objects represents an outcome of the process.

4. The computing system of claim 2, the operations further comprising:
   from at least a portion of the plurality of status data objects, determining one or more paths from the first status data object to the second status data object, wherein the second set of values is comprised of values of the second set of values defined for status data objects of the plurality of status data objects present in the one or more paths.

5. The computing system of claim 4, wherein determining one or more paths comprises determining a plurality of paths.

6. The computing system of claim 5, the operations further comprising:
   determining at least one score for given paths of the plurality of paths from the first status data object to the second status data object.

7. The computing system of claim 6, wherein a score of the at least one score is calculated based at least in part on one or more scores calculated for the one or more paths between nodes of the plurality of nodes that connect data objects of a respective pair of data objects of the fourth plurality of data objects.

8. The computing system of claim 4, wherein data objects of the first plurality of data objects comprise resource data objects, wherein a status data object of the plurality of status data objects references one or more resource data objects, and wherein a first status data object of the plurality of status data objects can be reached from a second status data object of the plurality of status data objects when the first status object is linked with the second status data object and resources data objects comprised by the first status data object have been obtained.

9. The computing system of claim 1, wherein the first set of attributes comprises an identifier of a status data object of a plurality of status data objects, the input data comprises a value identifying a first status data object of the plurality of status data objects, and the target object value comprises a request for status data objects of the plurality of status data objects that can be reached within a value of the execution time attribute.

10. The computing system of claim 1, wherein data objects of the fourth plurality of data objects comprise resource data objects and an edge connecting a first data object of the fourth plurality of data objects and a second data object of the fourth plurality of data objects can be traversed when resource data objects defined for the second data object have been obtained.

11. The computing system of claim 1, wherein the input data is provided in association with identifiers for one or more data objects of the second set of data objects that have already been obtained.

12. The computing system of claim 1, wherein the determining one or more paths between nodes comprises excluding from a given path of the one or more one or more paths data objects corresponding to the identifiers of one or more data objects of the second set of data objects that have already been obtained.

13. The computing system of claim 1, wherein the edge occurrence frequency is calculated from a set of training data based at least in part on a number of times of edge of the edges occurs in the set of training data.

14. The computing system of claim 1, wherein the node occurrence frequency is calculated from a set of training data based at least in part on a number of times a node of the nodes occurs in the set of training data.

15. The computing system of claim 1, wherein at least one data object of the second plurality data objects is not present in a path of the one or more paths that connect a given pair of data objects of the respective pairs of data object, where the plurality of data objects are of a first type, the operations further comprising:
from third plurality of data objects of the first type, the third plurality of data objects comprising the second plurality of data objects, determine at least one path that connects a first data object of the second plurality of data objects with second data object of the third plurality data objects downstream of the first data object; and
calculating one or more scores for paths of the at least one path.

16. The computing system of claim 1, wherein data objects of the fourth plurality of data objects are associated with at least one execution resource attribute, the operations further comprising:
calculating a total for the at least one execution resource attribute for given paths of the one or more paths.

17. A method, implemented in a computing system comprising at least one memory and at least one hardware processor coupled to the at least one memory, comprising:
receiving input data comprising a first set of values for a first set of attributes and a target objective value;
identifying a second set of values defined for the target objective value;
retrieving a first plurality of data objects representing values of the first set of values;
retrieving a second plurality of data objects representing values of the second set of values;
for respective pairs of data objects selected as an object of the first plurality of data objects and an object of the second plurality of data objects, determining at least one path of data objects from a third plurality of data objects that connects a given pair of data objects of the respective pairs of data objects to provide a fourth plurality of data objects;
forming a data structure comprising the fourth plurality of data objects, wherein data objects of the fourth plurality of data objects form nodes of the data structure, wherein connection paths between respective pairs of data objects in the fourth plurality of data objects are determinable from the data structure;
for respective pairs of data objects in the fourth plurality of data object, determining one or more paths between nodes of the plurality of nodes that connect data objects of a respective pair of data objects;
for paths of the one or more paths, calculating a path duration as a sum of duration attribute values for nodes in a given path of the one or more paths; and
displaying node information for nodes in the respective paths.

18. The method of claim 17, further comprising:
for nodes in the one or more paths, calculating a node occurrence frequency; and
for edges connecting a pair of nodes in the one or more paths, calculating an edge occurrence frequency.

19. The method of claim 18, further comprising:
calculating one or more scores for respective paths of the one or more paths using one or more of the node occurrence frequency, the edge occurrence frequency, or the duration, wherein the displaying node information comprises displaying at least one score of the one or more scores.

20. One or more non-transitory computer readable storage media comprising:
computer-executable instructions that, when executed by a computing system comprising at least one memory and at least one hardware processor coupled to the at least one memory, cause the computing system to receive input data comprising a first set of values for a first set of attributes and a target objective value, the first set of attributes comprising an execution time attribute;
computer-executable instructions that, when executed by the computing system, cause the computing system to identify a second set of values defined for the target objective value;
computer-executable instructions that, when executed by the computing system, cause the computing system to retrieve a first plurality of data objects representing values of the first set of values;
computer-executable instructions that, when executed by the computing system, cause the computing system to retrieve a second plurality of data objects representing values of the second set of values;
computer-executable instructions that, when executed by the computing system, cause the computing system to, for respective pairs of data objects selected as an object of the first plurality of data objects and an object of the second plurality of data objects, determine at least one path of data objects from a third plurality of data objects that connects a given pair of data objects of the respective pairs of data objects to provide a fourth plurality of data objects;
computer-executable instructions that, when executed by the computing system, cause the computing system to form a data structure comprising the fourth plurality of data objects, wherein data objects of the fourth plurality of data objects form nodes of the data structure, wherein connection paths between respective pairs of data objects in the fourth plurality of data objects are determinable from the data structure;
computer-executable instructions that, when executed by the computing system, cause the computing system to, for respective pairs of data objects in the fourth plurality of data object, determine one or more paths between nodes of the plurality of nodes that connect data objects of a respective pair of data objects;
computer-executable instructions that, when executed by the computing system, cause the computing system to, for nodes in the one or more paths, calculate a node occurrence frequency;
computer-executable instructions that, when executed by the computing system, cause the computing system to, for edges connecting a pair of nodes in the one or more paths, calculate an edge occurrence frequency;
computer-executable instructions that, when executed by the computing system, cause the computing system to, for paths of the one or more paths, calculate a path duration as a sum of duration attribute values for nodes in a given path of the one or more paths;
computer-executable instructions that, when executed by the computing system, cause the computing system to calculate one or more scores for respective paths of the one or more paths using one or more of the node occurrence frequency, the edge occurrence frequency, or the duration; and
computer-executable instructions that, when executed by the computing system, cause the computing system to display node information for nodes in the respective paths and at least one score of the one or more scores.

* * * * *